J. G. KING.
ASH SIFTER.
APPLICATION FILED SEPT. 13, 1915.
1,203,881.
Patented Nov. 7, 1916.
2 SHEETS—SHEET 1.
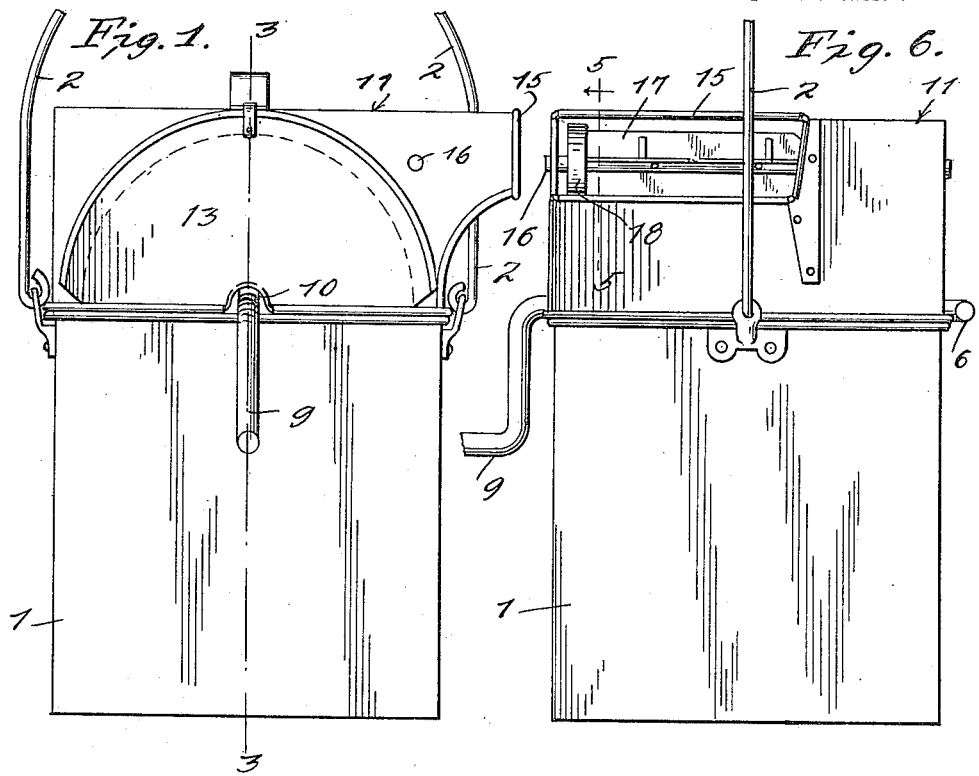
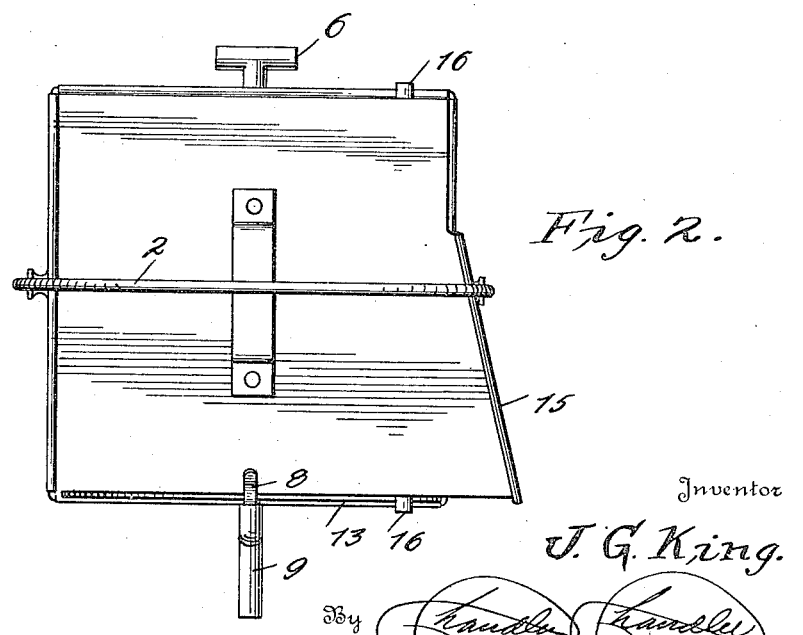
Witnesses
Inventor
J. G. King.
By
Attorneys

J. G. KING.
ASH SIFTER.
APPLICATION FILED SEPT. 13, 1915.

1,203,881.

Patented Nov. 7, 1916.
2 SHEETS—SHEET 2.

Witnesses

Inventor
J. G. King.
By
Attorneys.

UNITED STATES PATENT OFFICE.

JOHN G. KING, OF BURLINGTON, NORTH CAROLINA.

ASH-SIFTER.

1,203,881. Specification of Letters Patent. Patented Nov. 7, 1916.

Application filed September 13, 1915. Serial No. 50,443.

*To all whom it may concern:*

Be it known that I, JOHN G. KING, a citizen of the United States, residing at Burlington, in the county of Alamance, State of North Carolina, have invented certain new and useful Improvements in Ash-Sifters; and I do hereby declare the following to be a full, clear, and exact description of the invention, such as will enable others skilled in the art to which it appertains to make and use the same.

The present invention is directed to ash sifters and has for its object to so construct a device of this character that ashes can be removed from the fire place and deposited in the sifter without the escape of dust.

A further object of the invention is to provide an ash sifter so constructed that the natural draft of a chimney will cause the dust raised when placing the ashes in the device to escape into the chimney.

A still further object of the invention is to provide an ash sifter which is exceedingly simple in construction and one which can be conveniently carried from place to place.

Figure 3:
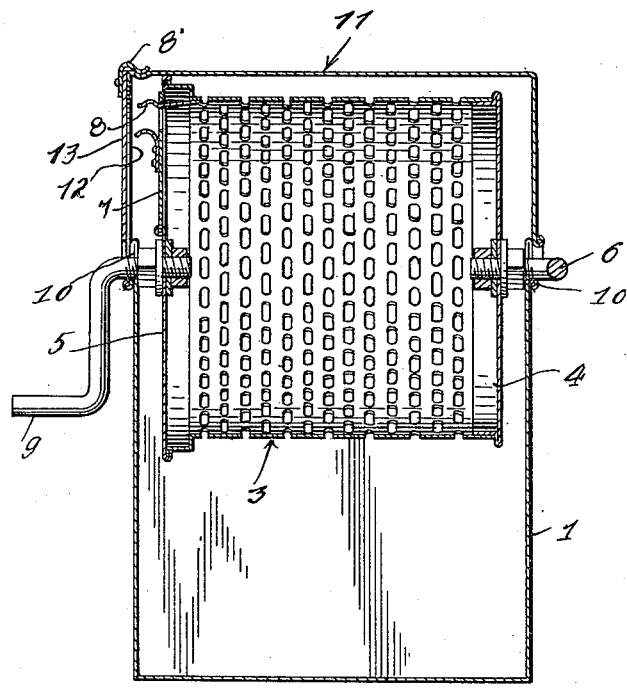
Figure 5:
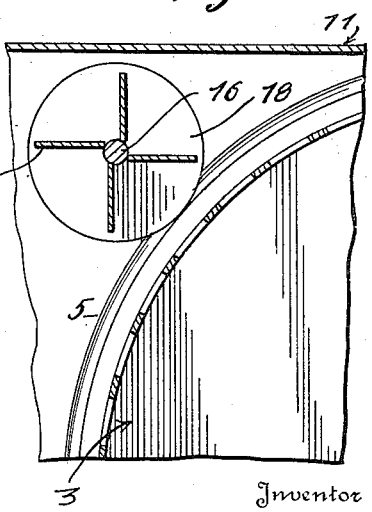
Figure 4:
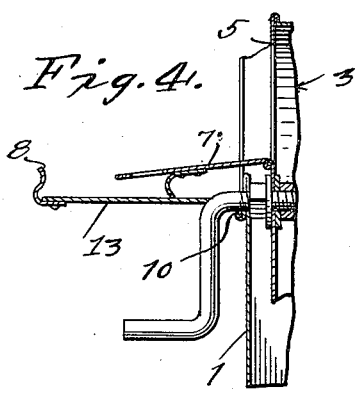

With these and other objects in view, this invention resides in the novel features of construction, formation, combination and arrangement of parts to be hereinafter more fully described, claimed and illustrated in the accompanying drawings, in which:

Figure 1 is a side elevation of the device. Fig. 2 is a top plan view. Fig. 3 is a sectional view on line 3—3 of Fig. 1. Fig. 4 is a similar view on line 3—3 of Fig. 1, showing the position of the doors when ashes are being placed in the rotary sieve. Fig. 5 is a sectional view on line 5—5 of Fig. 2. Fig. 6 is an end view.

Referring to the drawing 1 indicates the ash receptacle, which is rectangular in formation and has pivotally connected to its ends a bail 2, which serves to carry the device from place to place.

The rotary sieve 3 is provided with heads 4 and 5, the head 4 being removably engaged in one end of the sieve and is provided with a handle 6, while hingedly connected to the head 5 is a semi-circular closure 7 which can be locked against accidental opening by the spring catch 8, and readily opened when it is desired to place the ashes in the sieve. Fixed to the head 5 is a crank handle 9, said crank handle and handle 6 being adapted to rotatably engage the bearings 10 formed in the upper edge of the receptacle 1. The sieve 3 is preferably formed from perforated sheet metal bent into circular form, but it will be of course understood that heavy wire mesh may be used if desired. The cover 11 is provided at one side with a semi-circular opening 12 which is normally closed by the hingedly connected door 13, said door being of such size that the closure 7 can be swung outwardly therethrough, and will rest upon the door 13 when it is desired to place ashes in the sieve. When the closure 7 is engaged with the door 13, it is obvious that this engagement will prevent accidental rotation of the sieve, while ashes are being placed therein, thereby preventing the space 14 of the sieve from moving out of registry with the opening 12. When the closure 7 and door 13 are in their opened position it is obvious that any ashes which may drop from the shovel will be deposited thereon and when the closure and door are swung to their closed positions, the ashes collected thereon will be projected into the sieve and receptacle.

The cover 11 is provided at one side with a throat 15, which is spaced adjacent the grate of the open fire place, so that ashes arising from the device will be drawn into the chimney by its natural draft.

Rotatably supported by the cover 11 is a shaft 16, said shaft being provided with radially supported fan blades 17, which are disposed adjacent the throat 15 so that when the fan is in motion the dust will be forced through the throat and into the chimney. Fixed to one end of the shaft 16 is a disk 18, which is adapted to engage the rotary sieve, whereby when said sieve is rotated similar movement will be imparted to the fan shaft 16.

In use the device is placed so that the throat 15 will be located adjacent the open fire place. When it is desired to place ashes within the sieve 3 it is only necessary to open the door 13 and closure 7, after which the same are closed and the sieve 3 rotated through the medium of the crank handle 9. After the sifting operation the cover can be readily removed and the sieve 3 lifted from engagement with the receptacle 1 upon grasping the handle 6 and the crank handle 9.

It will be of course understood that the cinders will remain in the sieve 3, while the ashes will be collected in the receptacle 1, and after the ashes have been thoroughly sifted the cinders can be removed from the sieve 3 upon removing the head 4 therefrom.

What I claim is:

An ash sifter comprising a receptacle, a cover for the receptacle, a sieve rotatably supported by the receptacle, said cover having a throat projecting from one side thereof, a fan shaft rotatably supported by the cover and adjacent the throat, a disk fixed to the fan shaft and engaged with the sieve to rotate the fan shaft, as and for the purpose set forth.

In testimony whereof, I affix my signature, in the presence of two witnesses.

JOHN G. KING.

Witnesses:
W. I. HOLT,
A. A. APPLE.

Copies of this patent may be obtained for five cents each, by addressing the "Commissioner of Patents, Washington, D. C."